Dec. 29, 1942. J. H. TUTTLE 2,306,575
AUTOMOBILE BODY
Filed Dec. 26, 1939 3 Sheets-Sheet 1
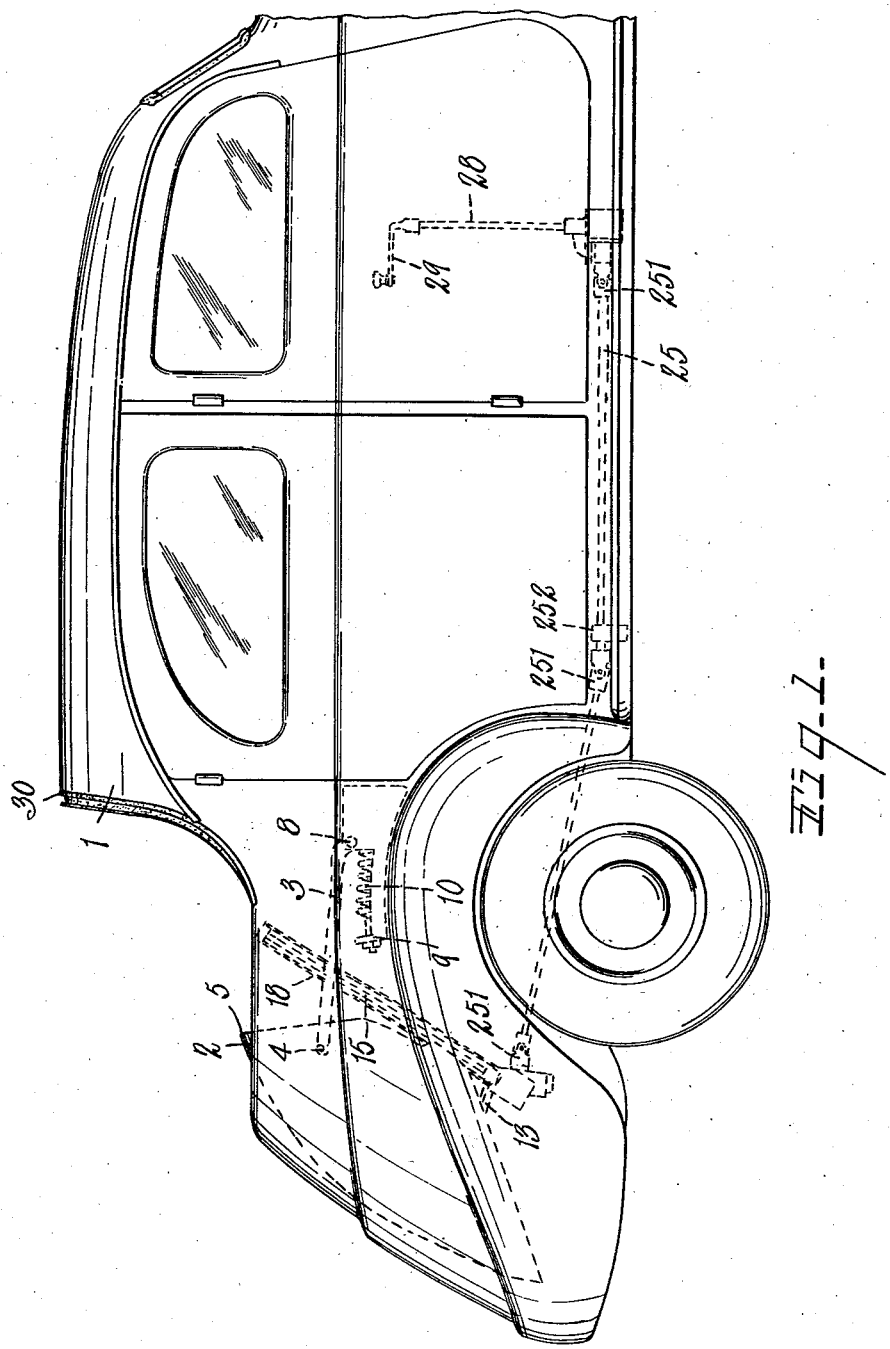
INVENTOR.
John H. Tuttle
BY
Earl & Chappell
ATTORNEYS.

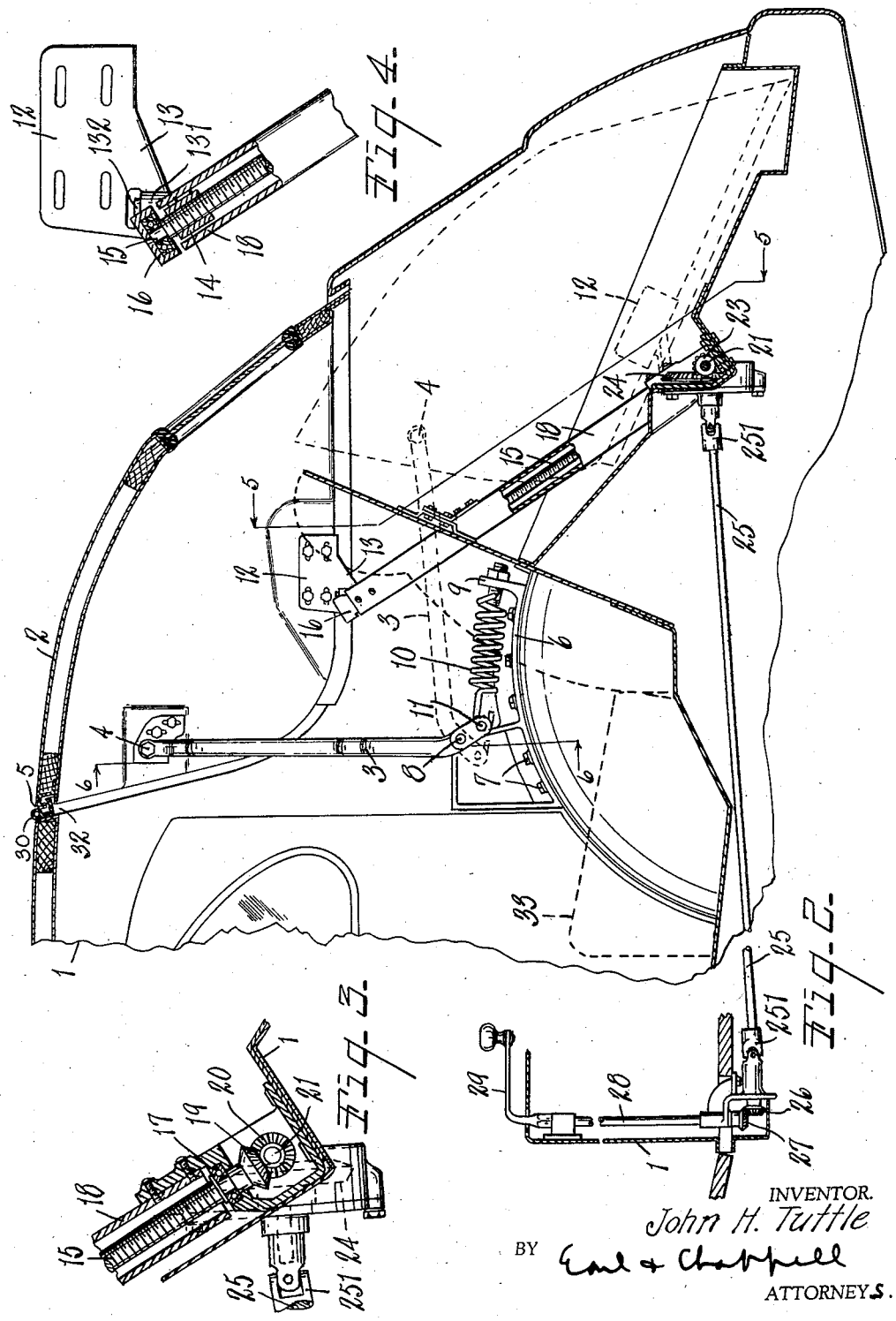

Dec. 29, 1942.  J. H. TUTTLE  2,306,575
AUTOMOBILE BODY
Filed Dec. 26, 1939  3 Sheets-Sheet 3
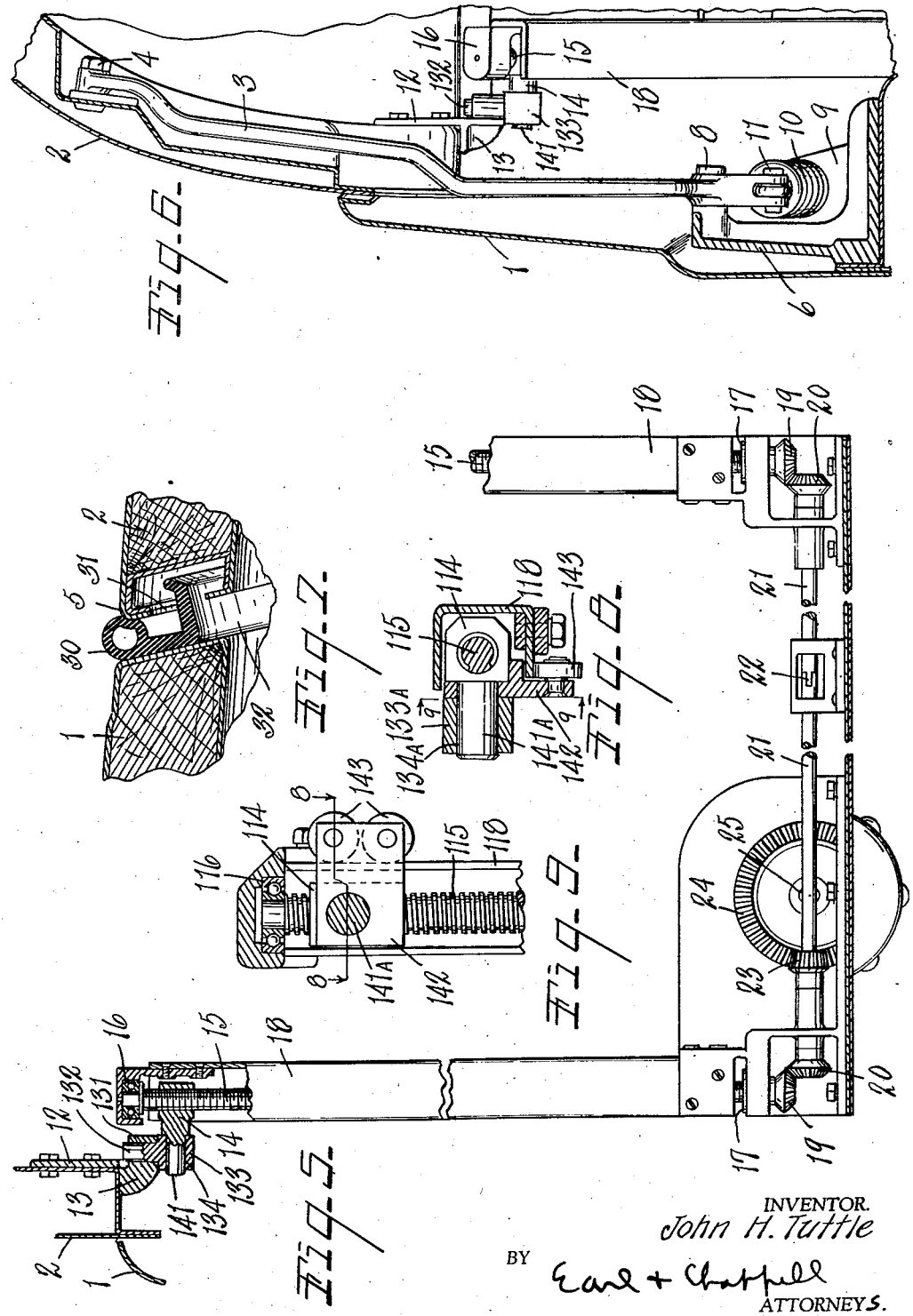
INVENTOR.
John H. Tuttle
BY
Earl + Chappell
ATTORNEYS.

Patented Dec. 29, 1942

2,306,575

UNITED STATES PATENT OFFICE 2,306,575

AUTOMOBILE BODY

John H. Tuttle, Kalamazoo, Mich., assignor to Checker Cab Manufacturing Corporation, Kalamazoo, Mich.

Application December 26, 1939, Serial No. 310,946

7 Claims. (Cl. 296—107)

This invention relates to improvements in automobile bodies.

The invention has for its objects,

First to produce a new and improved automobile body;

Second, to produce such a body in which a top section forming a portion of the top, rear and side of the body may be moved rearwardly into the body to provide a semi-open body;

Third, to provide such a body in which the top section is moved rearwardly into the body by new and improved means which may be manufactured inexpensively and may be easily installed;

Fourth, to provide such a body in which the means for moving the top section are particularly adapted for moving such a section forming a portion of a streamline body;

Fifth, to provide such a body in which the top section is moved from closed position to its position within the body in such a manner as to give maximum clearance for the heads of the occupants.

Objects pertaining to details and economies of the invention will appear from the description to follow. The invention is defined in the claims.

A structure embodying the features of my invention is clearly illustrated in the accompanying drawings, in which:

Fig. 1 is a side view of a portion of an automobile body embodying my invention.

Fig. 2 is a detail sectional view through the rear portion of such a body showing the operating mechanism.

Fig. 3 is a detail view partially in section showing the mechanism for rotating the top section moving screws.

Fig. 4 is a detail view partially in section showing the upper end of the top section shifting screws.

Fig. 5 is a detail view partially in section on line 5—5 of Fig. 2 showing the means for simultaneously operating the screws.

Fig. 6 is a detail sectional view taken on line 6—6 of Fig. 2 showing the arrangement of the top section guiding and supporting links.

Fig. 7 is a detail sectional view showing the manner of sealing the front edge of the body section and the rest of the body.

Fig. 8 is a detail view partly in section showing a modified form of nut taken on line 8—8 of Fig. 9.

Fig. 9 is a view partly in section taken on the line 9—9 of Fig. 8.

My new and improved body I is of streamlined construction. At the rear thereof I provide a rigidly formed top section 2 which forms a portion of the top, rear and sides of the body and is movable from a closed position shown in Fig. 2 to an open position shown in Fig. 1 and in dotted lines in Fig. 2 to make a semi-open vehicle body. The top section 2 moves from the closed position rearwardly into the rear of the body.

On each side of the car I provide links 3 pivoted at 4 to the sides of the top section 2 at points spaced rearwardly from and below the front edge 5 of the top section 2. Supporting and counterbalance units 6 are fastened to the body by bolts 7. Each of these units comprises a pivot 8 and a spring attaching lug 9. These units 6 are located on each side of the body and the link 3 is pivoted to the pivot 8.

A spring 10 extends from the lug 9 to a point 11 on an extension of the link 3 spaced from the pivotal connection 8 of the link 3. The extension of the link 3 is offset to provide clearance as shown in Fig. 2 and is so arranged that the tension of the spring 10 increases rapidly during the first portion of the backward movement of the top but does not increase so rapidly during the end of the movement rearwardly. The spring 10 serves as a counterbalance for the top section 2 and also to hold the section 2 tightly in closed position when it is in the full line position shown in Fig. 2.

At each side of the top section is a bracket 12 having an apertured portion 131 receiving a pintle 132 of a member 133 which is apertured at 134 to receive a pintle 141 on the nut 14 to provide a dual pivotal connection in two directions between the top section 2 and the nut 14. The bracket 12 is located downwardly and rearwardly from the point of pivotal connection between the link 3 and the top section 2.

Extending downwardly and rearwardly on each side of the body and mounted for rotation I provide a pair of screws 15, each in screw-threaded engagement with one of the nuts 14. The ends of the screws are provided with suitable bearings 16 and 17 fastened to the body. Surrounding each of the screws 15 is an inwardly facing channel 18 which serves as a stop to prevent movement of the nuts 14 laterally of the screw and to prevent lateral bending of the screws.

The lower end of each screw 15 is provided with a beveled gear 19 which meshes with the beveled gears 20 on a cross shaft 21 journaled in the body and provided with a sliding key connection 22. On the shaft 21 is a beveled gear 23 which meshes with the beveled gear 24 on the shaft 25 which extends forwardly through the body to a point adjacent the driver's seat. The shaft 25 is provided with universal joints 251 and a bearing 252. The front end of the shaft is provided with a beveled gear 26 meshing with a beveled gear 27 on a vertical shaft 28 provided with a crank 29 which may be turned for rotating the screws 15 simultaneously to effect movement of the top section.

In order to provide satisfactory seal when the top section is in closed position I provide a rubber buffer member 30 against which the front edge 5 of the top section 2 abuts when the top section is in closed position. The front edge of the top section is slotted as indicated at 31 to receive a channeled gutter member 32 which extends across the top to carry any rainwater down to the sides of the body.

The top section 2 is shifted rearwardly to form the semi-open body by turning the crank 29 which in turn turns the screws 15 to translate the nuts 14 downwardly and rearwardly. When the top section 2 is thus translated rearwardly and downwardly the links 3 swing about the pivot points 8. Simultaneously the rear end of the body section 2 is swung downwardly, causing the top section 2 to pivot around the pivot points 4 so that the front edge 5 of the top section 2 swings upwardly providing seat clearance for the occupants of the rear seat which is indicated in Fig. 3 at 33.

In Figs. 8 and 9 I show a modified form of nut. The nut 114 corresponding to the nut 14 is in screw-threaded engagement with the screw 115 corresponding to the screw 15 of the other form of the invention. The nut 114 has a pintle 14'a engaging the aperture 134a in the member 13?a. Between the member 13?a and the nut 114 I provide a member 142 which is in non-rotative engagement with the nut 114. The member 142 carries antifriction rollers 143 engaging the outside of the channel 118. This arrangement provides adequate antifriction support for the nut 114 as it moves along the channel 118.

The mechanism which I have provided for moving the top section rearwardly and into the body to form a semi-open body is very simple and may be made inexpensively. It is positive in its operation and provides the necessary clearance or head room to permit movement of the body section while the rear seat 33 of the body is occupied. Although the mechanism is simple it is strong and the channel members or stops 18 make it possible to move the top section, even while the vehicle is in motion, without possibility of injury to the mechanism or a collapsing of the top section if the automobile happens to strike a bump, putting a lateral strain on the screws 15 which tends to bend them.

The terms and expressions which have been here employed are used as terms of description and not of limitation. There is no intention in the use of such terms and expressions of excluding any equivalents of the features shown and described or portions thereof. It is recognized that various modifications are possible within the scope of the invention claimed.

Having thus described the invention what I claim as new and desire to secure by Letters Patent is:

1. In an automobile body, the combination of a top section forming a portion of the top, rear and sides of said body and movable from closed position to a position within the rear of the body to provide a semi-open body, a pair of support and counterbalance units fastened to the body, each having a pivot and a spring attaching lug, a pair of links each pivoted to the pivot of a support unit and having an end pivoted to the side of said top section at a point below and spaced rearwardly from the front edge of said top section and so positioned that when said top section is in closed position said link is substantially vertical, a counterbalance spring connected to the lug of each support unit and to said link at a point spaced from its point of pivotal connection to said support unit, a pair of nuts each pivoted to the side of said section at a point spaced rearwardly from the point of pivotal connection of said link and top section, a pair of screws, one disposed on and at each side of said body and extending downwardly and rearwardly, each screw being in screw-threaded engagement with one of said nuts and mounted for rotation whereby said top section may be moved by rotation of said screws and the consequent translation of said nuts, a pair of inwardly facing open channels, each mounted on said body and facing inwardly and enclosing a screw and nut to serve as a stop to lateral movement of said nut to prevent lateral bending of said screw, and means for simultaneously rotating said screws.

2. In an automobile body, the combination of a top section forming a portion of the top, rear and sides of said body and movable from closed position to a position within the rear of the body to provide a semi-open body, a pair of links each pivoted to the body and having an end pivoted to the side of said top section at a point below and spaced rearwardly from the front edge of said top section and so positioned that when said top section is in closed position said link is substantially vertical, a counterbalance spring connected to said body and to said link at a point spaced from its point of pivotal connection to said body, a pair of nuts each pivoted to the side of said section at a point spaced rearwardly from the point of pivotal connection of said link and top section, a pair of screws, one disposed on and at each side of said body and extending downwardly and rearwardly, each screw being in screw threaded engagement with one of said nuts and mounted for rotation whereby said top section may be moved by rotation of said screws and the consequent translation of said nuts, a pair of inwardly facing open channels each mounted on said body and facing inwardly and enclosing a screw and nut to serve as a stop to lateral movement of said nut to prevent lateral bending of said screw, means for simultaneously rotating said screws comprising a cross shaft geared to said screws, and a shaft geared to said cross shaft and extending forwardly through said body and having a crank operatively connected thereto.

3. In an automobile body, the combination of a top section forming a portion of the top, rear and sides of said body and movable from closed position to a position within the rear of the body to provide a semi-open body, a pair of links each pivoted to the body and having an end pivoted to the side of said top section at a point below and spaced rearwardly from the front edge of said top section and so positioned that when said top section is in closed position said link is substantially vertical, a counterbalance spring connected to said body and to said link at a point spaced from its point of pivotal connection to said body, a pair of nuts each pivoted to the side of said section at a point spaced rearwardly from the point of pivotal connection of said link and top section, a pair of screws, one disposed on and at each side of said body and extending downwardly and rearwardly, each screw being in screw threaded engagement with one of said nuts and mounted for rotation whereby said top section may be moved by rotation of said screws and the consequent translation of said nuts, a pair of inwardly facing open channels each mounted on said body and facing inwardly and enclosing a screw and nut to serve as a stop to lateral movement of said nut to prevent lateral bending of said screw, and means for simultaneously rotating said screws.

4. In an automobile body, the combination of a top section forming a portion of the top, rear and sides of said body and movable from closed position to a position within the rear of the body to provide a semi-open body, a pair of links each pivoted to the body and having an end pivoted to the side of said top section at a point below and spaced rearwardly from the front edge of said top section and so positioned that when said top section is in closed position said link is substantially vertical, a pair of nuts each pivoted to the side of said section at a point spaced rearwardly from the point of pivotal connection of said link and top section, a pair of screws, one disposed on and at each side of said body and extending downwardly and rearwardly, each screw being in screw threaded engagement with one of said nuts and mounted for rotation whereby said top section may be moved by rotation of said screws and the consequent translation of said nuts, a pair of inwardly facing open channels each mounted on said body and facing inwardly and enclosing a screw and nut to serve as a stop to lateral movement of said nut to prevent lateral bending of said screw, and means for simultaneously rotating said screws.

5. In an automobile body, the combination of a top section forming a portion of the top, rear and sides of said body and movable from closed position to a position within the rear of the body to provide a semi-open body, a pair of links each pivoted to the body and having an end pivoted to the side of said top section, a pair of nuts each pivoted to the side of said section at a point spaced rearwardly from the point of pivotal connection of said link and top section, a pair of screws, one disposed on and at each side of said body and extending downwardly and rearwardly, each screw being in screw threaded engagement with one of said nuts and mounted for rotation whereby said top section may be moved by rotation of said screws and the consequent translation of said nuts, a pair of inwardly facing open channels each mounted on said body and facing inwardly and enclosing a screw and nut to serve as a stop to lateral movement of said nut to prevent lateral bending of said screw, and means for simultaneously rotating said screws.

6. In an automobile body, the combination of a top section forming a portion of the top, rear and sides of said body and movable from closed position to a position within the rear of the body to provide a semi-open body, a pair of links each pivoted to the body and having an end pivoted to the side of said top section, a pair of nuts each pivoted to the side of said section, a pair of screws, one disposed on and at each side of said body and extending downwardly and rearwardly, each screw being in screw threaded engagement with one of said nuts and mounted for rotation whereby said top section may be moved by rotation of said screws and the consequent translation of said nuts, a pair of inwardly facing open channels each mounted on said body and facing inwardly and enclosing a screw and nut to serve as a stop to lateral movement of said nut to prevent lateral bending of said screw, and means for simultaneously rotating said screws.

7. In an automobile body, the combination of a top section forming a portion of the top, rear and sides of said body and movable from closed position to a position within the rear of said body to provide a semi-open body, a pair of links each pivoted to the body and having an end pivoted to said top section, a pair of nuts each pivoted to said top section at a point spaced from the point of pivotal connection between said links and said top section, a pair of screws disposed on and at each side of said body, each screw being in screw-threaded engagement with one of said nuts and mounted for rotation, stop means extending longitudinally of said screws to engage said nuts to prevent lateral movement thereof and thereby lateral bending of said screws, and means for simultaneously rotating said screws.

JOHN H. TUTTLE.